(12) United States Patent
Ŝevĉenko et al.

(10) Patent No.: US 12,088,629 B2
(45) Date of Patent: *Sep. 10, 2024

(54) SECURING NETWORK DEVICES AGAINST NETWORK VULNERABILITIES

(71) Applicant: UAB 360 IT, Vilnius (LT)

(72) Inventors: Aleksandr Ŝevĉenko, Vilnius (LT); Justas Rafanaviĉius, Vilniaus (LT)

(73) Assignee: UAB 360 IT, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 17/883,599

(22) Filed: Aug. 9, 2022

(65) Prior Publication Data

US 2024/0048583 A1 Feb. 8, 2024

Related U.S. Application Data

(63) Continuation of application No. 17/882,589, filed on Aug. 7, 2022, now Pat. No. 11,792,233.

(51) Int. Cl.
*H04L 9/40* (2022.01)

(52) U.S. Cl.
CPC .......... *H04L 63/20* (2013.01); *H04L 63/1433* (2013.01)

(58) Field of Classification Search
CPC .... H04L 63/1433; H04L 63/20; G06F 21/577
See application file for complete search history.

(56) References Cited

U.S. PATENT DOCUMENTS

| | | | | |
|---|---|---|---|---|
| 11,165,750 B1* | 11/2021 | H R | ...................... | H04L 63/0209 |
| 2012/0096553 A1* | 4/2012 | Srivastava | .............. | H04L 51/52 |
| | | | | 709/206 |
| 2014/0278347 A1* | 9/2014 | Luo | ......................... | G06F 40/40 |
| | | | | 704/3 |
| 2018/0095729 A1 | 4/2018 | Greiner et al. | | |
| 2018/0343236 A1* | 11/2018 | Pillay-Esnault | ........ | H04L 63/20 |

(Continued)

OTHER PUBLICATIONS

Tahreem Yaqoob et al., "Security Vulnerabilities, Attacks, Countermeasures, and Regulations of Networked Medical Devices—A Review," IEEE, 2019, pp. 3723-3768. (Year: 2019).*

(Continued)

*Primary Examiner* — Luu T Pham
*Assistant Examiner* — Canh Le
(74) *Attorney, Agent, or Firm* — The Pattani Law Group (57) ABSTRACT

A method including transmitting, by a network device to a security device, an initial security instruction set including a plurality of initial security instructions; transmitting, by the network device to the security device based on transmitting the initial security instruction set, an event signal associated with the security device carrying out a network-facing operation; transmitting, by the security device to the network device based on receiving the event signal, a security instruction associated with the security device carrying out the network-facing operation, the security instruction being from among the plurality of initial security instructions; translating, by the network device, the security instruction into a host instruction to be executed by the network device; and receiving, by the security device from the network device based on transmitting the security instruction, communication information to enable the security device to carry out the network-facing operation is disclosed. Various other aspects are contemplated.

20 Claims, 6 Drawing Sheets

(56) References Cited

U.S. PATENT DOCUMENTS

| | | | |
|---|---|---|---|
| 2020/0083716 A1* | 3/2020 | Gu | H02J 3/381 |
| 2020/0201625 A1* | 6/2020 | Kryzhanovsky | G06F 8/71 |
| 2020/0252380 A1* | 8/2020 | Sathe | H04W 12/06 |
| 2020/0349294 A1* | 11/2020 | Savry | G06F 9/30054 |
| 2020/0412728 A1* | 12/2020 | Gupta | H04L 63/1416 |
| 2021/0226980 A1* | 7/2021 | Riccetti | H04L 63/1433 |
| 2021/0288994 A1* | 9/2021 | Thompson | H04L 41/0894 |
| 2021/0409446 A1* | 12/2021 | Di Mattia | H04L 63/1408 |

OTHER PUBLICATIONS

Dongming Tang et al., "Efficient Packet Capture on Windows CE," 2011, pp. 110-114 (Year: 2011).*

* cited by examiner

SECURING NETWORK DEVICES AGAINST NETWORK VULNERABILITIES

CROSS REFERENCE

This application is a continuation of U.S. Non-Provisional patent application Ser. No. 17/882,589, filed on Aug. 7, 2022, and titled "Securing Network Devices Against Network Vulnerabilities," the entire contents of which are incorporated herein by reference.

FIELD OF DISCLOSURE

Aspects of the present disclosure generally relate to cyber security, and more particularly to securing network devices against network vulnerabilities such as cybercrimes.

BACKGROUND

A network device may rely on a network to communicate information and/or to communicate messages with another network device. Such information and/or messages may include private information and/or sensitive data associated with the network device. The communication over the network may be vulnerable as being susceptible to a cybercrime, through which a malicious entity may attempt to steal, alter, disable, expose, or destroy the information through unauthorized access to the communicating network devices. A cybercrime may include, for example, a malware attack, a phishing attack, a ransomware attack, a virus attack, etc. As a result, cyber security measures may be used to prevent occurrence of the cybercrime and/or to mitigate risks associated with the cybercrime.

SUMMARY

In one aspect, the present disclosure contemplates a method including transmitting, by a network device to a security device, an initial security instruction set including a plurality of initial security instructions associated with operation of the security device; transmitting, by the network device to the security device, an event signal associated with the security device carrying out the network-facing operation; receiving, by the network device from the security device based on transmitting the event signal, a security instruction associated with the security device carrying out the network-facing operation, the security instruction being from among the plurality of initial security instructions; translating, by the network device, the security instruction into a host instruction to be executed by the network device; and transmitting, by the network device to the security device based on executing the translated host instruction, communication information to enable the security device to carry out the network-facing operation.

In another aspect, the present disclosure contemplates a device including a memory and a processor communicatively coupled to the memory, the memory and the processor being configured to: transmit, to a security device, an initial security instruction set including a plurality of initial security instructions associated with operation of the security device; transmit, to the security device, an event signal associated with the security device carrying out the network-facing operation; receive, from the security device based at least in part on transmitting the event signal, a security instruction associated with the security device carrying out the network-facing operation, the security instruction being from among the plurality of initial security instructions; translate the security instruction into a host instruction to be executed by the network device; and transmit, to the security device based at least in part on executing the translated host instruction, communication information to enable the security device to carry out the network-facing operation.

In another aspect, the present disclosure contemplates a non-transitory computer readable medium storing instructions, which when executed by an infrastructure device, cause the infrastructure device to: transmit, to a security device, an initial security instruction set including a plurality of initial security instructions associated with operation of the security device; transmit, to the security device, an event signal associated with the security device carrying out the network-facing operation; receive, from the security device based at least in part on transmitting the event signal, a security instruction associated with the security device carrying out the network-facing operation, the security instruction being from among the plurality of initial security instructions; translate the security instruction into a host instruction to be executed by the network device; and transmit, to the security device based at least in part on executing the translated host instruction, communication information to enable the security device to carry out the network-facing operation.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

Figure 1:
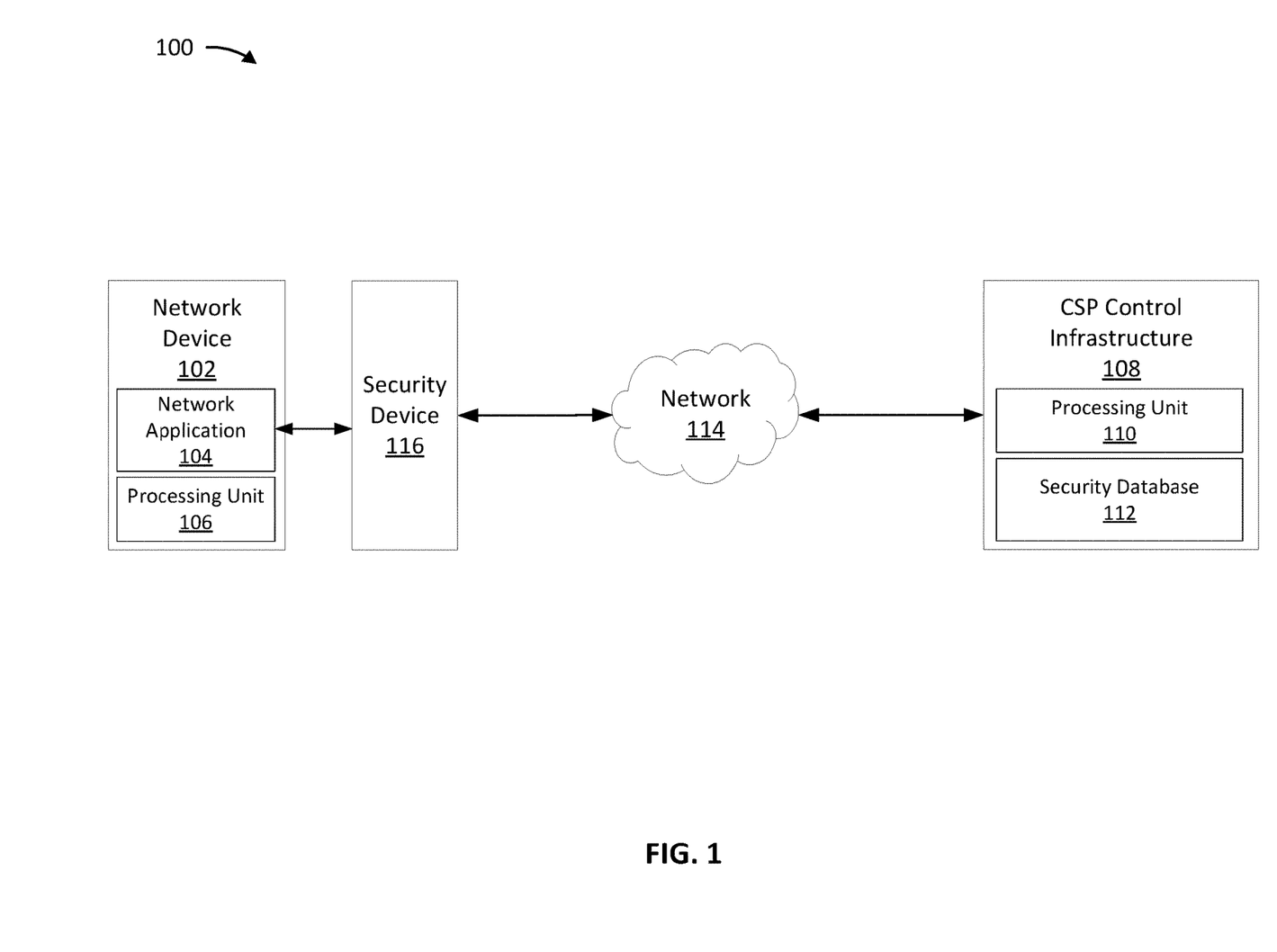
FIG. 1 is an illustration of an example system associated with securing network devices against network vulnerabilities, according to various aspects of the present disclosure.

FIG. 1 is an illustration of an example 100 associated with securing network devices against network vulnerabilities, according to various aspects of the present disclosure. Example 100 shows an architectural depiction of included components. In some aspects, the components may include a network device 102 configured to communicate over a network 114 with other network devices and/or with cyber security service provider (CSP) control infrastructure 108. In some aspects, as discussed elsewhere herein, the network device 102 may be associated with a security device 116 for carrying out network-facing operations.

In some aspects, a network device may include a device configured to be connected to a network and to communicate data with another device connected to the network. The network device 102 may install an instance of a network application 104 and may include a processing unit 106. Non-limiting examples of a network device 102 include, for example, a laptop, a mobile phone, a tablet computer, a desktop computer, a server computer, a smart device, a router, an Internet-of-Things (IoT) device such as an MSP smart home appliance, a smart home security system, an autonomous vehicle, a smart health monitor, smart factory equipment, a wireless inventory tracker, a biometric scanner, or a combination thereof.

In some aspects, the CSP control infrastructure 108 may be owned and operated by a cyber security service provider for purposes of, for example, providing cyber security services to network devices. In some aspects, the CSP control infrastructure 108 may include a processing unit 110 and a security database 112 associated with providing the cyber security services, which may include configuring and providing the network application 104 to the network device 102. In an example, the CSP control infrastructure 108 may configure and provide the network application 104 to secure the network devices 102 against network vulnerabilities. In an example, the network application 104 may interface with the security device 116.

The security device 116 may be associated with the network device in a manner such that network-facing operations are executed by the network device and are carried out by the security device over the network 114. The security device 116 may include and/or be associated with a security processor (e.g., processor 620) executing security ISA instructions (e.g. security instructions). In some aspects, executing security ISA instructions includes executing machine code determined based at least in part on utilizing one or more ISA instructions. In some aspects, the security processor may be local with respect to the security device 116. In some aspects, the security processor may be located remotely with respect to the security device 116. In some aspects, the security device 116 may be local with respect to the network device 102. In some aspects, the security device 116 may be located remotely with respect to the network device 102. In some aspects, the security device 116 may be a physical device. In some aspects, the security device 116 may be a virtual device.

In some aspects, the network 114 may include any digital network that permits several nodes to share and access resources. In some aspects, the network 114 may include one or more of, for example, a local-area network (LAN), a wide-area network (WAN), a campus-area network (CAN), a metropolitan-area network (MAN), a home-area network (HAN), Internet, Intranet, Extranet, and Internetwork.

The CSP control infrastructure 108 may include a combination of hardware and software components that enable provision of cyber security services to the network devices. The CSP control infrastructure 108 may interface with (the network applications on) the network devices via an application programming interface (API) (not shown), which may include one or more endpoints to a defined request-response message system. In an example, the API may be communicatively coupled with the processing unit 110 and/or the security database 112 to enable the CSP control infrastructure 108 to provide the cyber security services to the network devices 102. The processing unit 110 may be configured to configure and provide the network application 104 to the network devices 102. In some aspects, the processing unit 110 may be a logical unit including a logical component configured to perform complex operations associated with computing, for example, numerical weights related to various factors associated with providing the cyber security services. The processing unit 110 may utilize the API to transmit information associated with the cyber security services to the network devices 102.

Figure 6:
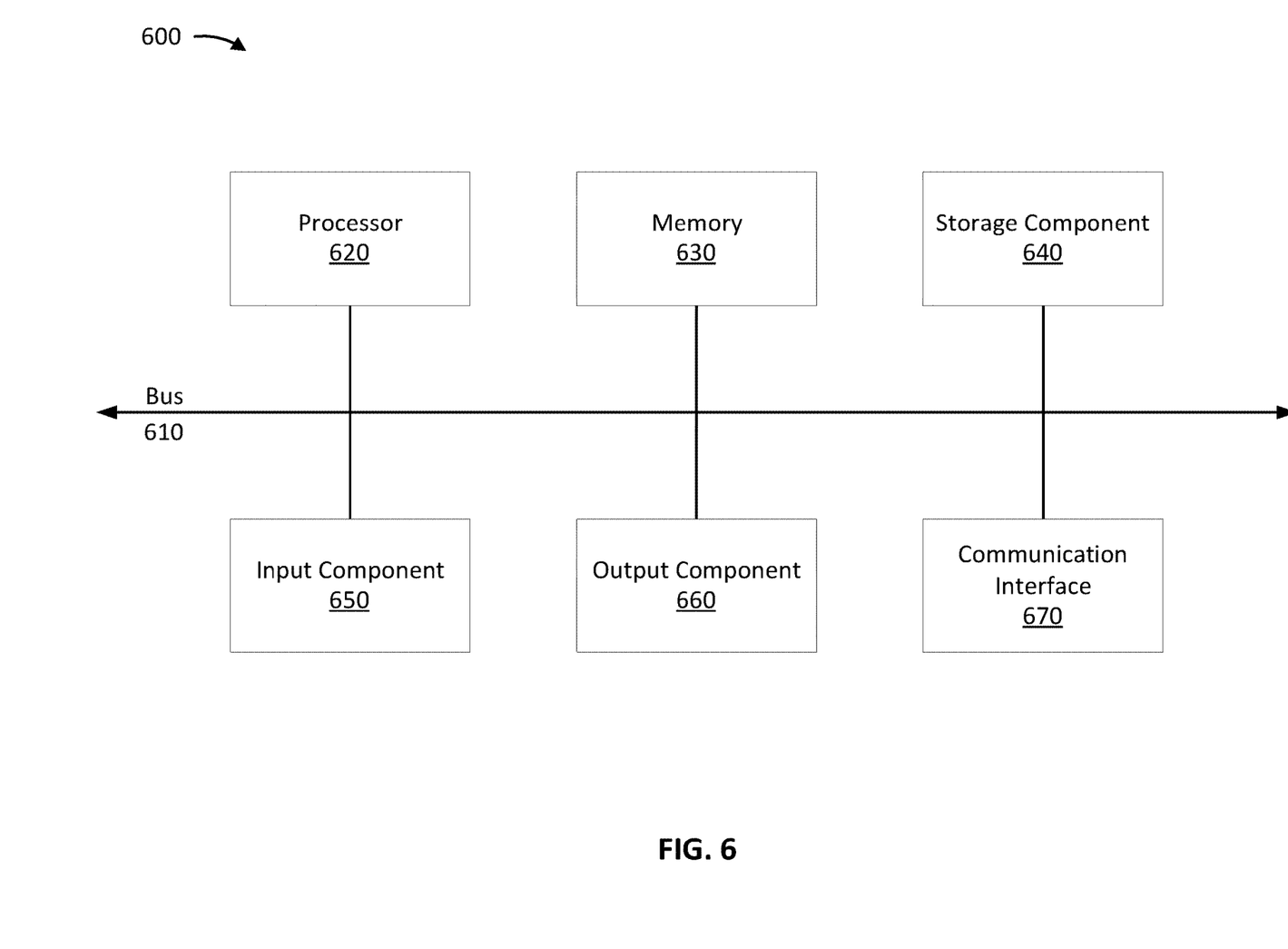
FIG. 6 is an illustration of example devices associated with securing network devices against network vulnerabilities, according to various aspects of the present disclosure.

One or more components (e.g., processing unit 110, security database 112, network application 104, processing unit 106) included in the CSP control infrastructure 108 and/or included in the network devices 102, as shown in FIG. 1, may further be associated with a controller/processor, a memory, a communication interface, or a combination thereof (e.g., FIG. 6). For instance, the one or more components may include or may be included in a controller/processor, a memory, or a combination thereof. In some aspects, the one or more components may be separate and distinct from each other. Alternatively, in some aspects, the one or more of the components may be combined with one or more of the other components. In some aspects, the one or more of the components may be local with respect to another one of the one or more of components. Alternatively, in some aspects, one or more of the components may be located remotely with respect to another one of the one or more of other components. Additionally, or alternatively, one or more components of the components may be implemented at least in part as software stored in a memory for execution by a processor. For example, a component (or a portion of a component) may be implemented as instructions or code stored in a non-transitory computer-readable medium and executable by a controller or a processor to perform the functions or operations of the component. Additionally, the one or more components may be configured to perform one or more functions described as being performed by another one of the one or more components shown in FIG. 1.

Although only one network device 102 and/or only one security device 116 is shown in FIG. 1, the present disclosure contemplates the system to include any number of network devices and/or security devices that perform the processes discussed herein in a similar and/or analogous manner.

As indicated above, FIG. 1 is provided as an example. Other examples may differ from what is described with regard to FIG. 1.

A network device may rely on a network (e.g., Internet) to communicate (e.g., transmit and/or receive) data and/or messages with other devices connected to the network. Such data and/or messages may include private information and/or sensitive data associated with the network device. Such private information and/or sensitive data may include, for example, financial information, medical information, business information, confidential information, etc. In an example, the network device may communicate the private information and/or sensitive data by utilizing a web browser to conduct transactions with a device associated with a financial institution (e.g., a bank). In another example, the network device may communicate the private information and/or sensitive data of a personal nature associated with, for example, a user of the network device by utilizing a messaging application and/or a social security application. In yet another example, the network device may communicate the private information and/or sensitive data by utilizing an email application to conduct business with a device associated with a business client or a business entity.

Communication of the data and/or messages over the network may make the network device susceptible to a cybercrime perpetrated by a malicious party who may utilize the communicated data and/or messages to gain unauthorized access to (e.g., hack into) the network device. In an example, the malicious party may monitor and/or track communication information (e.g., IP address, type of packets communicated, type of data included in communicated packets, exchanged handshake information, metadata, or a combination thereof) utilized by the network device to communicate the data and/or messages over the network. Based at least in part on the monitoring and/or tracking the communication information, the malicious party may determine information regarding a type of the network device and/or a machine code executed by an operating system utilized by the network device to operate. Further, the malicious party may utilize exploit software designed to exploit bugs associated with the type of the network device and/or the machine code, and gain unauthorized access to the network device based at least in part on exploiting the bugs. In some aspects, the exploit software may have been developed based at least in part on analyzing at least a portion of an instruction set architecture (ISA) associated with the machine code.

Unauthorized access by the malicious party may cause several security issues. In an example, the malicious party may gain unauthorized access to the private information and/or sensitive data. In another example, the modification may allow the malicious party to install malware onto the network device, the malware being designed to execute an unauthorized transmission of information stored in a memory associated with the network device and/or to execute an unauthorized deletion of data stored in the memory. In yet another example, the malware may be designed to affect operation of the operating system such that, for example, the operating system may run slower and/or associated circuitry may emit excessive heat and/or noise, thereby causing damage to the network device. The network device may inefficiently expend various device resources (e.g., processing resources, memory resources, power consumption resources, battery life, or the like) in efforts to mitigate the security issues caused by the unauthorized access.

Various aspects of systems and techniques discussed in the present disclosure enable securing network devices against network vulnerabilities. In some aspects, the network device may communicate with a CSP control infrastructure to receive cyber security services. In an example, the network device may receive and install a network application configured by the CSP control infrastructure to secure the network device against network vulnerabilities. The network device may utilize the network application as an interface to communicate with a security device. In some aspects, the security device may be associated with the network device in a manner such that network-facing operations executed by the network device are carried out by the security device. As a result, to other devices connected to the network, the security device appears to be executing the network-facing operations. To execute the network-facing operations, the network device may operate as a host device and may execute host ISA instructions (associated with machine code) (e.g., host instructions) by utilizing an associated processor (e.g., processing unit 106). To carry out the network-facing operations, the security device may execute security ISA instructions by utilizing an associated processor (e.g., processor 620). In some aspects, the network device may initially determine the security ISA instructions for carrying out the network-facing operations. Additionally, the network device may periodically determine new security ISA instructions to be executed by the security device while carrying out the network-facing operations. By periodically determining the new security ISA instructions and enabling the security device to periodically utilize the new security ISA instructions for carrying out the network-facing operations, the network device and/or the security device may deter a malicious party from determining information regarding a type of the network device (and/or the security device) and/or a machine code executed by the network device (and/or by the security device). In this way, the malicious party may be deterred from utilizing exploit software designed to exploit bugs associated with the machine code, thereby deterring the malicious party from gaining unauthorized access to the network device and/or to the security device. As a result, issues arising from unauthorized access by the malicious party may be mitigated, and efficient utilization of device resources (e.g., processing resources, memory resources, power consumption resources, battery life, or the like) for tasks suitable for conducting network-facing operations may be enabled.

In some aspects, ISA instructions may represent a part of an abstract model associated with a computer that indicates how a processor is controlled by software. The ISA may operate as an interface between hardware components and the software, indicating what the processor may be capable of doing and/or how it gets done.

In some aspects, a processor (e.g., processor 106) associated with a network device executing a network application may transmit, to a security device, an initial security ISA instruction set including a plurality of initial security ISA instruction associated with operation of the security device; transmit, to the security device, an event signal associated with the security device carrying out the network-facing operation; receive, from the security device based at least in part on transmitting the event signal, a security ISA instruction associated with the security device carrying out the network-facing operation, the security ISA instruction being from among the plurality of initial security ISA instruction; translate the security ISA instruction into a host ISA instruction to be executed by the network device; and transmit, to the security device based at least in part on executing the translated host ISA instruction, communication information to enable the security device to carry out the network-facing operation.

Figure 2:
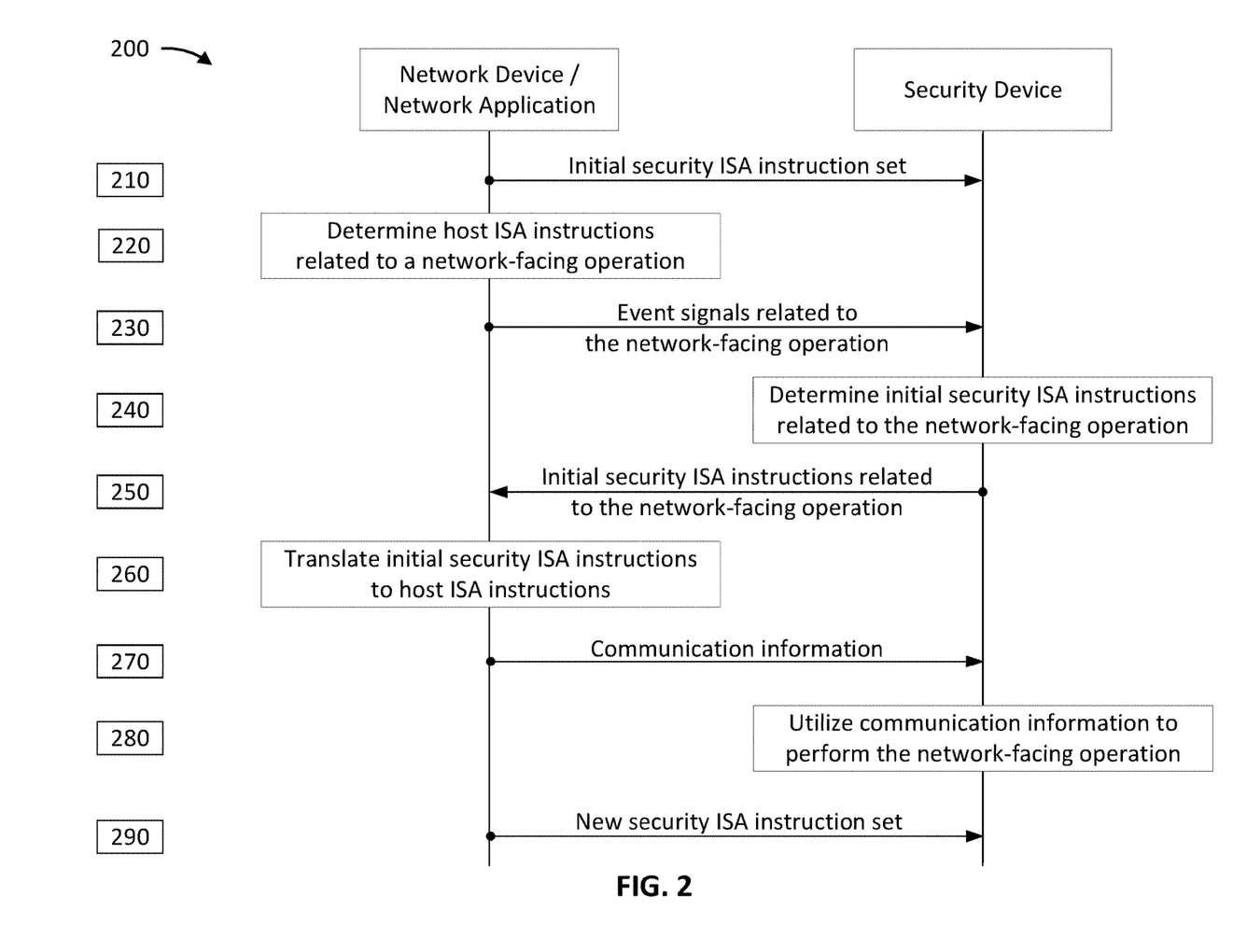
FIG. 2 is an illustration of an example flow associated with securing network devices against network vulnerabilities, according to various aspects of the present disclosure.

FIG. 2 is an illustration of an example flow 200 associated with securing network devices against network vulnerabilities, according to various aspects of the present disclosure. The example flow 200 may include a network device (e.g., network device 102) in communication with a security device (e.g., security device 116) over a network (e.g., network 114). The network device may install a network application (e.g., network application 104) configured and provided by an infrastructure device associated with a CSP control infrastructure (e.g., CSP control infrastructure 108). In some aspects, the CSP control infrastructure may configure and provide the network application to enable securing the network device against network vulnerabilities. The network device may utilize the network application as an interface to communicate with the security device. The network device and/or the network application may utilize an associated processor (e.g., processing unit 106, processor 620) to perform the processes discussed herein. The security device may utilize an associated security application and/or processor (e.g., processing 110, processor 620) to perform the processes discussed herein.

In some aspects, the network application may enable the network device to receive information to be processed by the network application and/or by the CSP control infrastructure. The network application may include a graphical user interface to receive the information via a local input interface (e.g., touch screen, keyboard, mouse, pointer, etc.) associated with the network device. The information may be received via text input or via a selection from among a plurality of options (e.g., pull down menu, etc.). In some aspects, the network application may activate and/or enable, at an appropriate time, the graphical interface for receiving the information. For instance, the network application may cause a screen (e.g., local screen) associated with the network device to display, for example, a pop-up message to request entry of the information. Further, the network application may enable transmission of at least a portion of the information to the CSP control infrastructure. In some aspects, the network application may utilize a processing unit (e.g., processing unit 106, processor 620) associated with the network device to perform processes/operations associated with securing the network device against network vulnerabilities. In an example, as discussed below in further detail, the network application may serve as an interface between the network device and the security device. In some aspects, the network application may relay (e.g., transmit) host signals from the network device to the security device and may translate security ISA instructions from the security device into host ISA instructions to the network device. The security application may perform similar and/or analogous functions as those discussed above with respect to the network application.

As shown by reference numeral 210, the network device may determine and transmit an initial security ISA instruction set to the security device. The initial security ISA instruction set may include initial security ISA instructions to be executed by the security device. Executing the initial security ISA instructions may enable the security device to carry out a plurality of operations including, for example, network-facing operations executed by the network device. In some aspects, the initial security ISA instructions may include instructions related to, for example, jumping (e.g., navigating) to a designated random access memory (RAM) address, loading information from RAM for an associated processor (e.g., processor 620), storing information to a RAM address, copying information from one location to another, calling a sub-routine, comparing information stored in a memory location and/or a register, or a combination thereof. In some aspects, multiple ISA instruction sets may be transferred to the security device 116 and may be executed randomly in accordance with occurrence of a predefined condition (e.g. after a predefined amount of time has passed, after a predefined amount of data has been communicated, after a predefined number of communication packets have been communicated, or a combination thereof).

As shown by reference numeral 220, the network device may determine host ISA instructions related to performing a network-facing operation. In an example, the network device may determine host ISA instructions related to accessing a website over the network. Such host ISA instructions may include instructions related to, for example, inputting information from an input device (e.g., keyboard, mouse, etc.), determining event signals associated with input information, relaying the event signals to the security device, receiving data from the security device, outputting received data utilizing an output device (e.g., screen, monitor, etc.), or a combination thereof. Further, the network device may execute the host ISA instructions for accessing the website. In some aspects, based at least in part on executing the host ISA instructions, the network device may determine event signals related to accessing the website.

Based at least in part on determining the event signal, as shown by reference numeral 230, the network device may utilize the network application to relay the event signals to the security device. In some aspects, the network application may operate as an interface between the network device and the security device for communicating data including, for example, relaying the event signals. In some aspects, the event signal may identify, to the security device, the network-facing operation to be carried out.

Based at least in part on receiving the event signal, the security device may invoke a security application installed on the security device, the security application being capable of carrying out the network-facing operation (e.g., accessing the website). Further, based at least in part on invoking the security application, as shown by reference numeral 240, the security device may determine initial security ISA instructions related to the security application accessing the website. Based at least in part on determining such initial security ISA instructions, as shown by reference numeral 250, the security device may transmit such initial security ISA instructions to the network application for execution.

Based at least in part on receiving the initial security ISA instructions related to the security application carrying out the network-facing operation (e.g., accessing the website), as shown by reference numeral 260, the network application may translate the received initial security ISA instructions into host ISA instructions for execution. Execution of the host ISA instructions may enable the network device to determine communication information associated with accessing the website. In some aspects, the communication information may include, for example, network packets, domain information, identified data of interest to request, or a combination thereof. Further, as shown by reference numeral 270, the network device may relay the communication information to the security device via the network application.

Based at least in part on receiving the communication information, as shown by reference numeral 280, the security application may determine initial security ISA instructions associated with utilizing the communication information to access the website. In some aspects, the security application may carry out the initial security ISA instructions to utilize the domain information to transmit the network packets over the network to a server identified by the domain information. In some aspects, the identified server may be responsible for hosting the website. In this way, the security application may access the website, which may include requesting and receiving data of interest from the website. For instance, the network packets may include information regarding the data of interest to be received from the website. In this case, based at least in part on transmitting the network packets, the security application may receive the data of interest from the host server. Further, the security application may determine initial security ISA instructions associated with transmitting the received data of interest to the network device. The security application may transmit such initial security ISA instructions and/or the data of interest to the network application.

The network application may translate the initial security ISA instructions associated with the data of interest into host ISA instructions. Further, the network device may execute the host ISA instructions to process the received data of interest. In some aspects, executing the host ISA instructions may enable the network device to render the data of interest on an output device associated with the network device. In an example, executing the host ISA instructions may enable the network device to display the data of interest on a screen associated with the network device.

As shown by reference numeral 290, the network device may determine and transmit a new security ISA instruction set to the security device. The new security ISA instruction set may include new security ISA instructions to be executed by the security device. Executing the new security ISA instructions may enable the security device to carry out the plurality of operations including, for example, network-facing operations executed by the network device. The new security ISA instructions may include instructions related to, for example, jumping (e.g., navigating) to a designated random access memory (RAM) address, loading information from RAM for the associated processor (e.g., processor 620), storing information to a RAM address, copying information from one location to another, calling a sub-routine, comparing information stored in a memory location and/or a register, or a combination thereof.

In some aspects, the network device may periodically determine and transmit the new security ISA instruction set to the security device. In some aspects, the network device may occasionally determine and transmit the new security ISA instruction set to the security device based at least in part on the security device completing performance of a threshold amount of network-facing operations. In some aspects, the network device may occasionally determine and transmit the new security ISA instruction set to the security device when the security device is to repeat performance of a given network-facing operation.

In some aspects, the network device may modify the security ISA instruction set. For instance, the network device may determine the new security ISA instruction set to be different with respect to the initial security ISA instruction set such that the new security ISA instructions are different with respect to the initial security ISA instructions. In an example, the new security ISA instructions for carrying out a network-facing operation (e.g., accessing a website) may be different from the initial security ISA instructions for carrying out the network-facing operation (e.g., accessing the website). In some aspects, the network device may determine the initial security ISA instruction set for performing network-facing operations using a first set of random numbers and/or alphanumeric characters and may determine the new security ISA instruction set for performing the network-facing operations using a second set of random numbers and/or alphanumeric characters, the first set being different from the second set. In some aspects, the network device may associate an initial security ISA instruction for carrying out a given network-facing operation with a first set of random numbers and/or alphanumeric characters and may associate a new security ISA instruction for carrying out the given network-facing operation with a second set of random numbers and/or alphanumeric characters, the first set being different from the second set.

In this way, by periodically and/or occasionally modifying the security ISA instruction sets and enabling the security device to utilize different security ISA instructions to carry out network-facing operations, the network device may deter a malicious party from determining (i) information regarding a type of the network device and/or security device, and/or (ii) the machine code executed by the network device and/or by the security device. As a result, the network device may deter the malicious party from gaining unauthorized access to the network device and/or to the security device, thereby enabling efficient utilization of device resources (e.g., processing resources, memory resources, power consumption resources, battery life, or the like) for tasks suitable for performing, for example, network-facing operations.

As indicated above, FIG. 2 is provided as an example. Other examples may differ from what is described with regard to FIG. 2.

Figure 3:
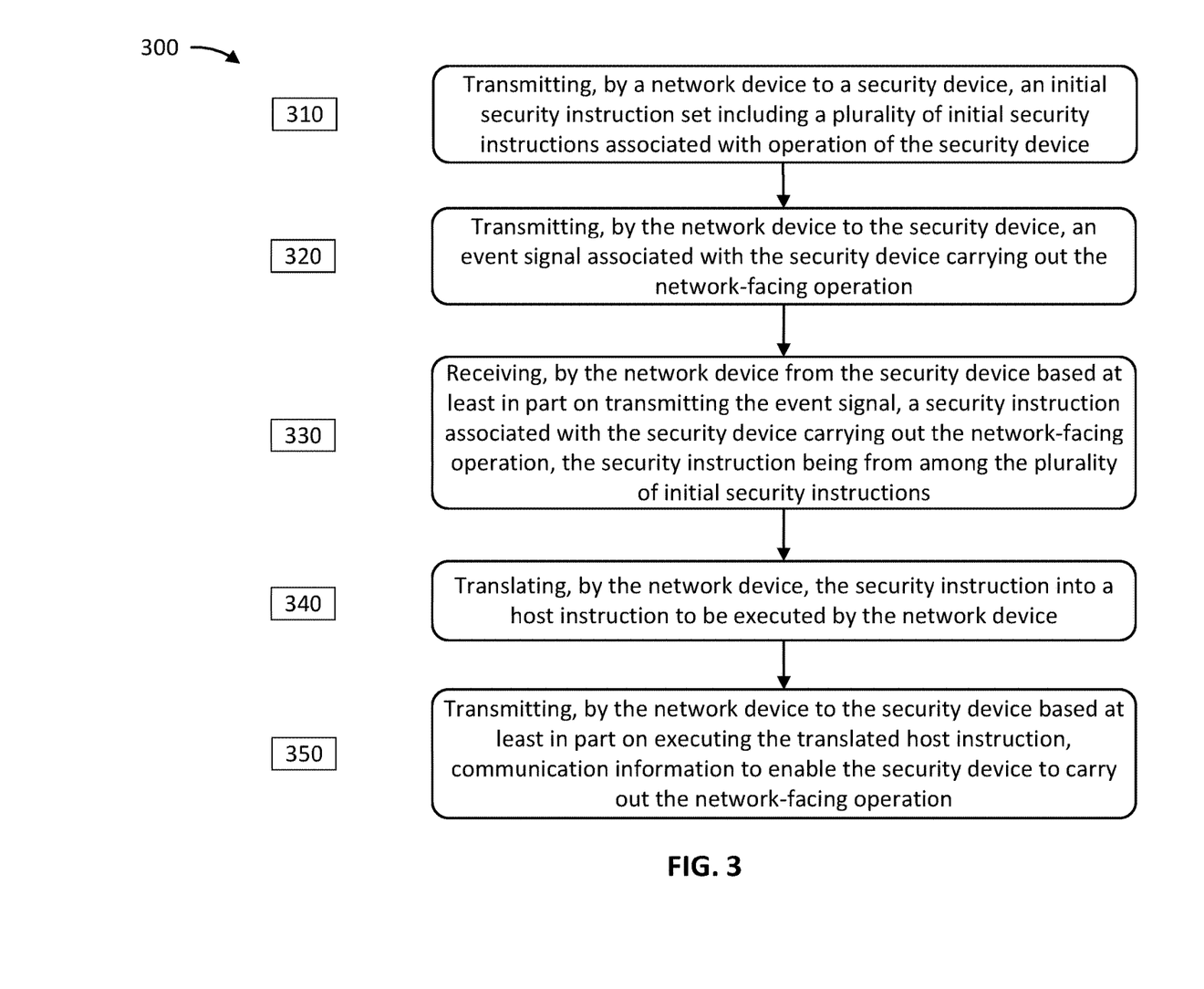
FIG. 3 is an illustration of an example process associated with securing network devices against network vulnerabilities, according to various aspects of the present disclosure.

FIG. 3 is an illustration of an example process 300 associated with securing network devices against network vulnerabilities, according to various aspects of the present disclosure. In some aspects, the process 300 may be performed by a memory and/or a processor/controller (e.g., processing unit 106, processor 620) associated with a network device (e.g., network device 102) executing a network application. As shown by reference numeral 310, process 300 may include transmitting, by a network device to a security device, an initial security instruction set including a plurality of initial security instructions associated with operation of the security device. For instance, the network device may utilize an associated communication interface (e.g., communication interface 670) along with the associated memory and/or processor to transmit, to a security device, an initial security instruction set including a plurality of initial security instructions associated with operation of the security device, as discussed elsewhere herein.

As shown by reference numeral 320, process 300 may include transmitting, by the network device to the security device, an event signal associated with the security device carrying out the network-facing operation. For instance, the network device may utilize the associated communication interface, memory, and/or processor to transmit, to the security device, an event signal associated with the security device carrying out the network-facing operation, as discussed elsewhere herein.

As shown by reference numeral 330, process 300 may include receiving, by the network device from the security device based at least in part on transmitting the event signal, a security instruction associated with the security device carrying out the network-facing operation, the security instruction being from among the plurality of initial security instructions. For instance, the network device may utilize the associated memory and/or processor to receive, from the security device based at least in part on transmitting the event signal, a security instruction associated with the security device carrying out the network-facing operation, the security instruction being from among the plurality of initial security instructions, as discussed elsewhere herein.

As shown by reference numeral 340, process 300 may include translating, by the network device, the security instruction into a host instruction to be executed by the network device. For instance, the network device may utilize the associated memory and/or processor to translate the security instruction into a host instruction to be executed by the network device, as discussed elsewhere herein.

As shown by reference numeral 350, process 300 may include transmitting, by the network device to the security device based at least in part on executing the translated host instruction, communication information to enable the security device to carry out the network-facing operation. For instance, the network device may utilize the associated communication interface, memory, and/or processor to transmit, to the security device based at least in part on executing the translated host instruction, communication information to enable the security device to carry out the network-facing operation, as discussed elsewhere herein.

Process 300 may include additional aspects, such as any single aspect or any combination of aspects described below and/or in connection with one or more other processes described elsewhere herein.

In a first aspect, process 300 may include determining the plurality of initial security instructions based at least in part on associating each of the plurality of initial security instructions with respective sets of random numbers.

In a second aspect, alone or in combination with the first aspect, in process 300, transmitting the event signal includes identifying the network-facing operation to the security device.

In a third aspect, alone or in combination with the first through second aspects, process 300 may include receiving, based at least in part on transmitting the communication information, data of interest based at least in part on the security device carrying out the network-facing operation.

In a fourth aspect, alone or in combination with the first through third aspects, process 300 may include determining a new security instruction set including a plurality of new security instructions associated with operation of the security device, and transmitting the new security instruction set to the security device.

In a fifth aspect, alone or in combination with the first through fourth aspects, process 300 may include determining a new security instruction set based at least in part on modifying the initial security instruction set.

In a sixth aspect, alone or in combination with the first through fifth aspects, in process 300, transmitting the communication information includes identifying data of interest to be obtained by the security device in association with carrying out the network-facing operation.

Although FIG. 3 shows example blocks of the process, in some aspects, the process may include additional blocks, fewer blocks, different blocks, or differently arranged blocks than those depicted in FIG. 3. Additionally, or alternatively, two or more of the blocks of the process may be performed in parallel.

As indicated above, FIG. 3 is provided as an example. Other examples may differ from what is described with regard to FIG. 3.

Figure 4:
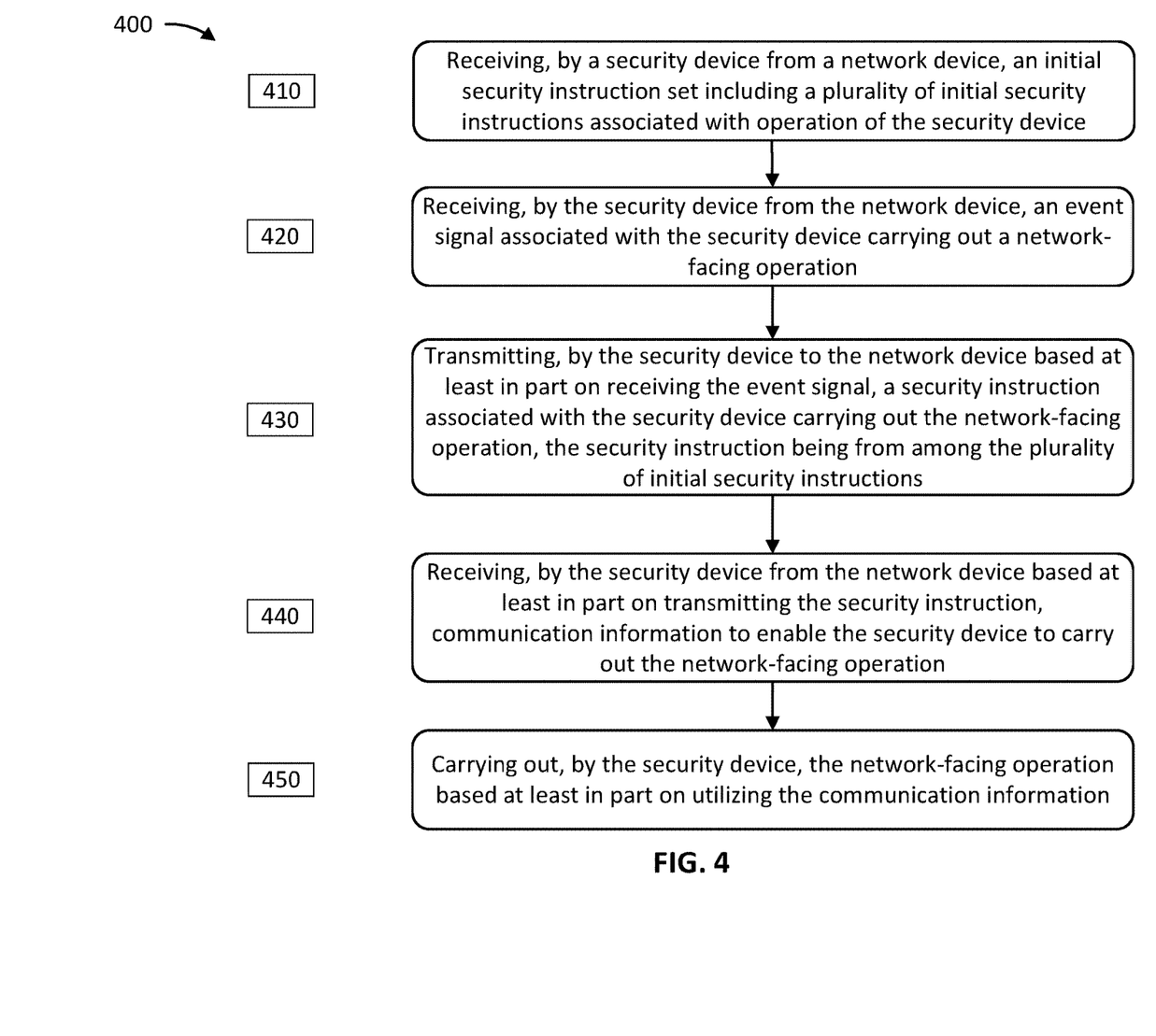
FIG. 4 is an illustration of an example process associated with securing network devices against network vulnerabilities, according to various aspects of the present disclosure.

FIG. 4 is an illustration of an example process 400 associated with securing network devices against network vulnerabilities, according to various aspects of the present disclosure. In some aspects, the process 400 may be performed by a memory and/or a processor/controller (e.g., processor 620) associated with a security device (e.g., security device 116). As shown by reference numeral 410, process 400 may receiving, by a security device from a network device, an initial security instruction set including a plurality of initial security instructions associated with operation of the security device. For instance, the security device may utilize an associated communication interface (e.g., communication interface 670) with the associated memory and/or processor to receive, from a network device, an initial security instruction set including a plurality of initial security instructions associated with operation of the security device, as discussed elsewhere herein.

As shown by reference numeral 420, process 400 may include receiving, by the security device from the network device, an event signal associated with the security device carrying out a network-facing operation. For instance, the security device may utilize the associated communication interface, memory, and/or processor to receive, from the network device, an event signal associated with the security device carrying out a network-facing operation, as discussed elsewhere herein.

As shown by reference numeral 430, process 400 may include transmitting, by the security device to the network device based at least in part on receiving the event signal, a security instruction associated with the security device carrying out the network-facing operation, the security instruction being from among the plurality of initial security instructions. For instance, the security device may utilize the associated communication interface, memory, and/or processor to transmit, to the network device based at least in part on receiving the event signal, a security instruction associated with the security device carrying out the network-facing operation, the security instruction being from among the plurality of initial security instructions, as discussed elsewhere herein.

As shown by reference numeral 440, process 400 may include receiving, by the security device from the network device based at least in part on transmitting the security instruction, communication information to enable the security device to carry out the network-facing operation. For instance, the security device may utilize the associated communication interface, memory, and/or processor to receive, from the network device based at least in part on transmitting the security instruction, communication information to enable the security device to carry out the network-facing operation, as discussed elsewhere herein.

As shown by reference numeral 450, process 400 may include carrying out, by the security device, the network-facing operation based at least in part on utilizing the communication information. For instance, the security device may utilize the associated memory and/or processor to carry out the network-facing operation based at least in part on utilizing the communication information, as discussed elsewhere herein.

Process 400 may include additional aspects, such as any single aspect or any combination of aspects described below and/or in connection with one or more other processes described elsewhere herein.

In a first aspect, in process 400, receiving the communication information includes receiving the communication information based at least in part on translation of the security instruction into a host instruction to be executed by the network device.

In a second aspect, alone or in combination with the first aspect, in process 400, receiving the communication information includes receiving information identifying data of interest to be obtained over the network by the security device in association with carrying out the network-facing operation.

In a third aspect, alone or in combination with the first through second aspects, in process 400, determining the security instruction associated with the security device carrying out the network-facing operation includes determining the security instruction from among security instructions related to a security application to be utilized by the security device to carry out the network-facing operation.

In a fourth aspect, alone or in combination with the first through third aspects, process 400 may include receiving a new security instruction set associated with operation of the security device, the new security instruction set being determined based at least in part on modifying the initial security instruction set.

In a fifth aspect, alone or in combination with the first through fourth aspects, process 400 may include periodically receiving new security instruction sets associated with operation of the security device, the new security instruction sets being determined based at least in part on modifying previous initial security instruction sets.

In a sixth aspect, alone or in combination with the first through fifth aspects, process 400 may include invoking a security application, installed on the security device, to enable the security device to carry out the network-facing operation.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

Figure 5:
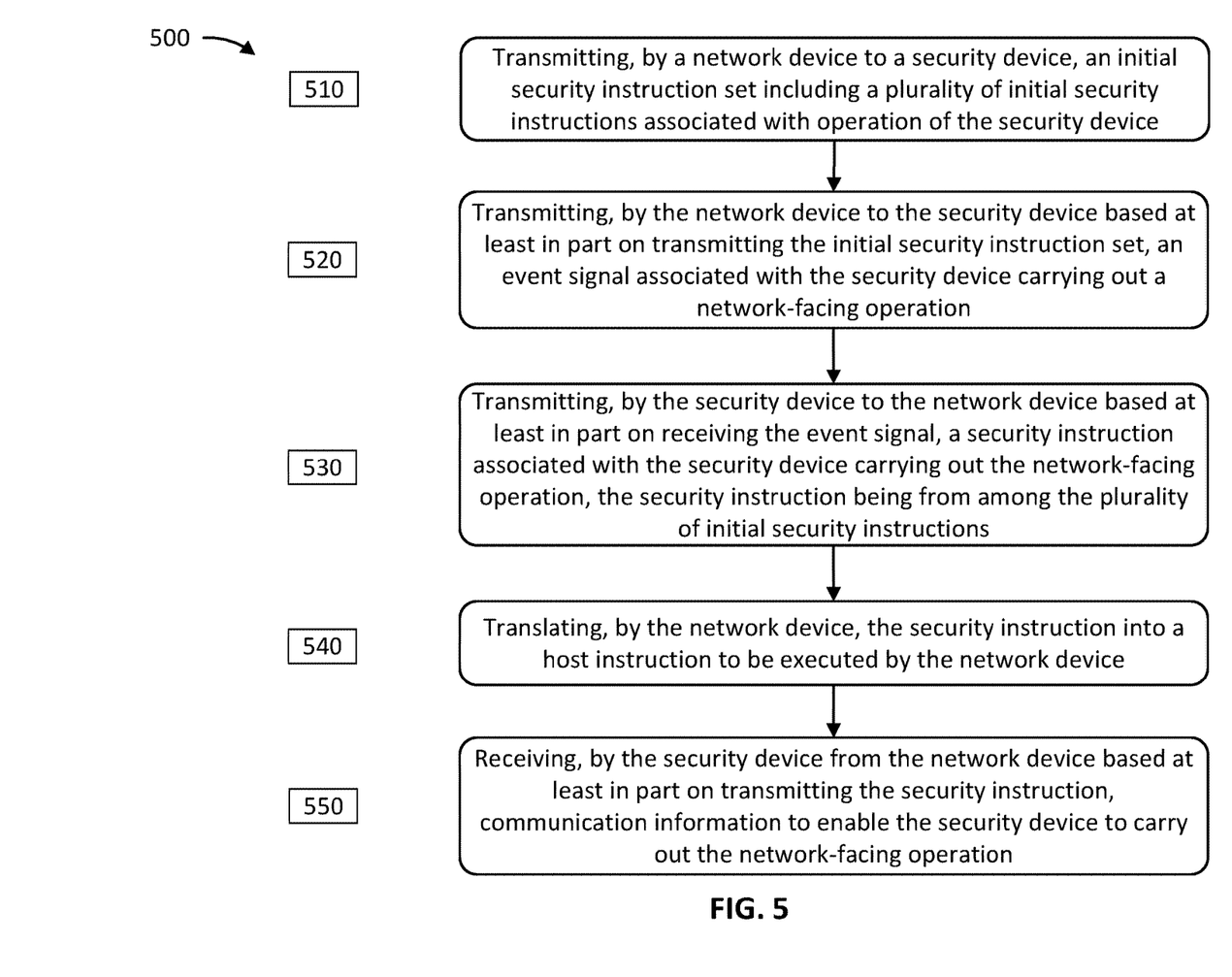
FIG. 5 is an illustration of an example process associated with securing network devices against network vulnerabilities, according to various aspects of the present disclosure.

FIG. 5 is an illustration of an example process 500 associated with securing network devices against network vulnerabilities, according to various aspects of the present disclosure. In some aspects, the process 500 may be performed by a memory and/or a processor/controller (e.g., processing unit 116, processor 620) associated with a network device (e.g., network device 102) executing a network application and by a memory and/or a processor/controller (e.g., processor 620) associated with a security device (e.g., security device 116). As shown by reference numeral 510, process 500 may include transmitting, by a network device to a security device, an initial security instruction set including a plurality of initial security instructions associated with operation of the security device. For instance, the network device may utilize an associated communication interface (e.g., communication interface 670) with the associated memory and/or processor to transmit, to a security device, an initial security instruction set including a plurality of initial security instructions associated with operation of the security device, as discussed elsewhere herein.

As shown by reference numeral 520, process 500 may include transmitting, by the network device to the security device based at least in part on transmitting the initial security instruction set, an event signal associated with the security device carrying out a network-facing operation. For instance, the network device may utilize the associated communication interface, memory, and/or processor to transmit, to the security device based at least in part on transmitting the initial security instruction set, an event signal associated with the security device carrying out a network-facing operation, as discussed elsewhere herein.

As shown by reference numeral 530, process 500 may include transmitting, by the security device to the network device based at least in part on receiving the event signal, a security instruction associated with the security device carrying out the network-facing operation, the security instruction being from among the plurality of initial security instructions. For instance, the security device may utilize an associated communication interface (e.g., communication interface 670) with the associated memory and/or processor to transmit, to the network device based at least in part on receiving the event signal, a security instruction associated with the security device carrying out the network-facing operation, the security instruction being from among the plurality of initial security instructions, as discussed elsewhere herein.

As shown by reference numeral 540, process 500 may include translating, by the network device, the security instruction into a host instruction to be executed by the network device. For instance, the network device may utilize the associated memory and/or processor to translate the security instruction into a host instruction to be executed by the network device, as discussed elsewhere herein.

As shown by reference numeral 550, process 500 may include receiving, by the security device from the network device based at least in part on transmitting the security instruction, communication information to enable the security device to carry out the network-facing operation. For instance, the security device may utilize the associated communication interface, memory, and/or processor to receive, from the network device based at least in part on transmitting the security instruction, communication information to enable the security device to carry out the network-facing operation, as discussed elsewhere herein.

Process 500 may include additional aspects, such as any single aspect or any combination of aspects described below and/or in connection with one or more other processes described elsewhere herein.

In a first aspect, in process 500, receiving the communication information includes the security device receiving the communication information based at least in part on translation of the security instruction into a host instruction to be executed by the network device.

In a second aspect, alone or in combination with the first aspect, in process 500, receiving the communication information includes the security device receiving information identifying data of interest to be obtained over the network by the security device in association with carrying out the network-facing operation.

In a third aspect, alone or in combination with the first through second aspects, process 500 may include determining, by the network device based at least in part on modifying the initial security instruction set, a new security instruction set including a plurality of new security instructions associated with operation of the security device.

In a fourth aspect, alone or in combination with the first through third aspects, process 500 may include periodically receiving, by the security device, new security instruction sets associated with operation of the security device, the new security instruction sets being determined based at least in part on modifying previous initial security instruction sets.

In a fifth aspect, alone or in combination with the first through fourth aspects, process 500 may include determining, by the network device, a new security instruction set including a plurality of new security instructions associated with operation of the security device.

In a sixth aspect, alone or in combination with the first through fifth aspects, process 500 may include receiving, by the network device, data of interest based at least in part on the security device carrying out the network-facing operation.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of example devices 600 associated with securing network devices against network vulnerabilities, according to various aspects of the present disclosure. In some aspects, the example devices 600 may form part of or implement the systems, servers, environments, infrastructures, components, devices, or the like described elsewhere herein (e.g., network device, security device, etc.) and may be used to perform example processes described elsewhere herein. The example devices 600 may include a universal bus 610 communicatively coupling a processor 620, a memory 630, a storage component 640, an input component 650, an output component 660, and a communication interface 670.

Bus 610 may include a component that permits communication among multiple components of a device 600. Processor 620 may be implemented in hardware, firmware, and/or a combination of hardware and software. Processor 620 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 620 may include one or more processors capable of being programmed to perform a function. Memory 630 may include a random access memory (RAM), a read only memory (ROM), and/or another type of dynamic or static storage device (e.g., a flash memory, a magnetic memory, and/or an optical memory) that stores information and/or instructions for use by processor 620.

Storage component 640 may store information and/or software related to the operation and use of a device 600. For example, storage component 640 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 650 may include a component that permits a device 600 to receive information, such as via user input (e.g., a touch screen display, a keyboard, a keypad, a mouse, a button, a switch, and/or a microphone). Additionally, or alternatively, input component 650 may include a component for determining location (e.g., a global positioning system (GPS) component) and/or a sensor (e.g., an accelerometer, a gyroscope, an actuator, another type of positional or environmental sensor, and/or the like). Output component 660 may include a component that provides output information from device 600 (via, for example, a display, a speaker, a haptic feedback component, an audio or visual indicator, and/or the like).

Communication interface 670 may include a transceiver-like component (e.g., a transceiver, a separate receiver, a separate transmitter, and/or the like) that enables a device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a Wi-Fi interface, a cellular network interface, and/or the like.

A device 600 may perform one or more processes described elsewhere herein. A device 600 may perform these processes based on processor 620 executing software instructions stored by a non-transitory computer-readable medium, such as memory 630 and/or storage component 640. As used herein, the term "computer-readable medium" may refer to a non-transitory memory device. A memory device may include memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 6 are provided as an example. In practice, a device 600 may include additional components, fewer components, different components, or differently arranged components than those shown in FIG. 6. Additionally, or alternatively, a set of components (e.g., one or more components) of a device 600 may perform one or more functions described as being performed by another set of components of a device 600.

As indicated above, FIG. 6 is provided as an example. Other examples may differ from what is described with regard to FIG. 6.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" or "device" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    transmitting, by a network device to a security device, an initial security machine code instruction set including a plurality of initial security machine code instructions to be executed by an operating system associated with the security device;
    transmitting, by the network device to the security device based at least in part on transmitting the initial security machine code instruction set, an event signal identifying a network-facing operation that is to be carried out by the security device over a network;
    transmitting, by the security device to the network device based at least in part on receiving the event signal, a security machine code instruction associated with the security device carrying out the network-facing operation, the security machine code instruction being selected from among the plurality of initial security machine code instructions based at least in part on the network-facing operation;
    translating, by the network device, the security machine code instruction into a host machine code instruction to be executed by an operating system associated with the network device;
    receiving, by the security device from the network device based at least in part on transmitting the security machine code instruction, communication information to carry out the network-facing operation;
    determining, by the network device after the security device carries out the network-facing operation, a new security machine code instruction set including a plurality of new security machine code instructions associated with operation of the security device;
    transmitting, by the network device to the security device, the new security instruction set to the security device; and
    periodically receiving, by the security device from the network device, an additional new security machine code instruction set associated with operation of the security device, the additional new security machine code instruction set being determined based at least in part on modifying one or more previous security machine code instruction sets, wherein
    the initial security machine code instruction set is determined using a first set of alphanumeric characters and the new security machine code instruction set is determined using a second set of alphanumeric characters, the first set being different from the second set.

2. The method of claim 1, wherein receiving the communication information includes the security device receiving the communication information based at least in part on translation of the security machine code instruction into the host machine code instruction to be executed by the network device.

3. The method of claim 1, wherein receiving the communication information includes the security device receiving information identifying data of interest to be obtained over the network by the security device in association with carrying out the network-facing operation.

4. The method of claim 1, further comprising:
determining, by the network device, the new security machine code instruction set based at least in part on modifying the initial security machine code instruction set.

5. The method of claim 1, wherein the security machine code instruction associated with the security device carrying out the network-facing operation is related to a security application to be utilized by the security device to carry out the network-facing operation.

6. The method of claim 1, wherein the network-facing operation includes accessing a website on a network.

7. The method of claim 1, further comprising:
receiving, by the network device, data of interest based at least in part on the security device carrying out the network-facing operation.

8. A system, comprising:
a network device; and
a security device associated with the network device, wherein
the network device is configured to transmit, to the security device, an initial security machine code instruction set including a plurality of initial security machine code instructions to be executed by an operating system associated with the security device;
the network device is configured to transmit, to the security device based at least in part on transmitting the initial security machine code instruction set, an event signal identifying a network-facing operation that is to be carried out by the security device over a network;
the security device is configured to transmit, to the network device based at least in part on receiving the event signal, a security machine code instruction associated with the security device carrying out the network-facing operation, the security machine code instruction being selected from among the plurality of initial security machine code instructions based at least in part on the network-facing operation;
the network device is configured to translate the security machine code instruction into a host machine code instruction to be executed by an operating system associated with the network device;
the security device is configured to receive, from the network device based at least in part on transmitting the security machine code instruction, communication information to carry out the network-facing operation;
the network device is configured to determine, after the security device carries out the network-facing operation, a new security machine code instruction set including a plurality of new security machine code instructions associated with operation of the security device;
the network device is configured to transmit, to the security device, the new security instruction set to the security device; and
the security device is configured to periodically receive an additional new security machine code instruction set associated with operation of the security device, the additional new security machine code instruction set being determined based at least in part on modifying one or more previous security machine code instruction sets, wherein
the initial security machine code instruction set is determined using a first set of alphanumeric characters and the new security machine code instruction set is determined using a second set of alphanumeric characters, the first set being different from the second set.

9. The system of claim 8, wherein, to receive the communication information, the security device is configured to receive the communication information based at least in part on translation of the security machine code instruction into the host machine code instruction to be executed by the network device.

10. The system of claim 8, wherein, to receive the communication information, the security device is configured to receive information identifying data of interest to be obtained over the network by the security device in association with carrying out the network-facing operation.

11. The system of claim 8, wherein the network device is configured to determine the new security machine code instruction set based at least in part on modifying the initial security machine code instruction set.

12. The system of claim 8, wherein the security machine code instruction associated with the security device carrying out the network-facing operation is related to a security application to be utilized by the security device to carry out the network-facing operation.

13. The system of claim 8, wherein the network-facing operation includes accessing a website on a network.

14. The system of claim 8, wherein the network device is configured to receive data of interest based at least in part on the security device carrying out the network-facing operation.

15. A non-transitory computer-readable medium configured to store instructions, which when executed by a network device or by a security device, configure:
the network device to transmit, to the security device, an initial security machine code instruction set including a plurality of initial security machine code instructions to be executed by an operating system associated with the security device;
the network device to transmit, to the security device based at least in part on transmitting the initial security machine code instruction set, an event signal identifying a network-facing operation that is to be carried out by the security device over a network;
the security device to transmit, to the network device based at least in part on receiving the event signal, a security machine code instruction associated with the security device carrying out the network-facing operation, the security machine code instruction being selected from among the plurality of initial security machine code instructions based at least in part on the network-facing operation;
the network device to translate the security machine code instruction into a host machine code instruction to be executed by an operating system associated with the network device;
the security device to receive, from the network device based at least in part on transmitting the security machine code instruction, communication information to carry out the network-facing operation;
the network device to determine, after the security device carries out the network-facing operation, a new security machine code instruction set including a plurality of new security machine code instructions associated with operation of the security device;
the network device to transmit, to the security device, the new security instruction set to the security device;
the security device to periodically receive an additional new security machine code instruction set associated with operation of the security device, the additional new security machine code instruction set being determined based at least in part on modifying one or more previous security machine code instruction sets, wherein the initial security machine code instruction set is determined using a first set of alphanumeric characters and the new security machine code instruction set is determined using a second set of alphanumeric characters, the first set being different from the second set.

16. The non-transitory computer-readable medium of claim 15, wherein, to receive the communication information, the security device is configured to receive the communication information based at least in part on translation of the security machine code instruction into the host machine code instruction to be executed by the network device.

17. The non-transitory computer-readable medium of claim 15, wherein, to receive the communication information, the security device is configured to receive information identifying data of interest to be obtained over the network by the security device in association with carrying out the network-facing operation.

18. The non-transitory computer-readable medium of claim 15, wherein the network device is configured to determine the new security machine code instruction set based at least in part on modifying the initial security machine code instruction set.

19. The non-transitory computer-readable medium of claim 15, wherein the security machine code instruction associated with the security device carrying out the network-facing operation is related to a security application to be utilized by the security device to carry out the network-facing operation the security device to periodically receive an additional new security machine code instruction set associated with operation of the security device, the additional new security machine code instruction set being determined based at least in part on modifying one or more previous security machine code instruction sets.

20. The non-transitory computer-readable medium of claim 15, wherein the network-facing operation includes accessing a website on a network.

* * * * *